United States Patent [19]

Zecher et al.

[11] 4,088,637

[45] May 9, 1978

[54] PROCESS FOR THE PRODUCTION OF POLYCONDENSATES CONTAINING IMIDE GROUPS

[75] Inventors: Wilfried Zecher; Willi Dünwald; Rudolf Merten, all of Leverkusen, Germany

[73] Assignee: Bayer Aktiengesellschaft, Leverkusen-Bayerwerk, Germany

[21] Appl. No.: 725,381

[22] Filed: Sep. 22, 1976

[30] Foreign Application Priority Data

Sep. 25, 1975 Germany .......................... 2542706

[51] Int. Cl.² .................. C08G 18/80; C08G 18/78
[52] U.S. Cl. ........................ 260/77.5 TB; 260/30.2; 260/30.6 R; 260/30.8 DS; 260/31.4 R; 260/32.4; 260/32.6 NR; 260/32.8 N; 260/33.4 UR; 260/33.6 UB; 260/33.8 UB; 260/77.5 R; 260/77.5 NC
[58] Field of Search .................... 260/77.5 R, 77.5 N, 260/77.5 TB

[56] References Cited

U.S. PATENT DOCUMENTS

| | | | |
|---|---|---|---|
| 3,560,446 | 2/1971 | Zecher et al. | 260/77.5 R |
| 3,652,424 | 3/1972 | Jackson et al. | 260/77.5 NC |
| 3,666,725 | 5/1972 | Irwin | 260/77.5 NC |
| 3,697,480 | 10/1972 | Schade et al. | 260/77.5 NC |
| 3,748,315 | 7/1973 | Wooster et al. | 260/77.5 TB |
| 3,822,240 | 7/1974 | Schmitt et al. | 260/77.5 TB |
| 3,893,978 | 7/1975 | de Cleur | 260/77.5 TB |
| 3,896,089 | 7/1975 | Noda et al. | 260/77.5 R |
| 3,996,223 | 12/1976 | Gupta et al. | 260/77.5 NC |

FOREIGN PATENT DOCUMENTS 274,842  4/1964  Australia .................... 260/77.5 NC

*Primary Examiner*—H.S. Cockeram
*Attorney, Agent, or Firm*—Connolly and Hutz

[57] ABSTRACT

A process for the production of polyimides by the condensation of cyclic polycarboxylic acid anhydrides with polyisocyanates and isocyanurates substituted with masked isocyanate groups in the presence of lactams or polyols, and the production of coatings on metals, in particular of lacquers on wires, and of films thereof.

14 Claims, No Drawings

PROCESS FOR THE PRODUCTION OF POLYCONDENSATES CONTAINING IMIDE GROUPS

The invention relates to a process for the production of polyimides by the condensation of cyclic polycarboxylic acid anhydrides with polyisocyanates and isocyanurates substituted with masked isocyanate groups in the presence of lactams or polyols, and the production of coatings on metals, in particular of lacquers on wires, and of films thereof.

It is already known that polycondensates coupled via imide groups can be produced by the reaction of diisocyanates with polycarboxylic acid anhydrides in the presence of lactams or polyols. Although these polyimides are used for the production of films or for wire lacquering, they cannot be used for many other applications because of their softening temperatures.

It has now been found that polyimides having improved physical properties are obtained if additionally isocyanurates substituted with masked isocyanate groups are also used in the polycondensation.

An object of the invention is therefore an improved process for the production of polycondensates coupled via imide groups by the condensation of cyclic polycarboxylic acid anhydrides with polyisocyanates and lactams or polyols, the improvement comprises that the polyisocyanates are partly used in the form of isocyanurates masked isocyanate groups.

Surprisingly, the polycondensates produced by the inventive process, preferably polyamide imides or polyester imides, are distinguished by increased softening temperatures, while the remaining properties of the polymers such as elasticity and heat ageing are rather the same. Moreover, when the polycondensates are stoved to form lacquer films the reaction times are shorter, which in wire-lacquering make it possible to increase throughout speeds and thus to apply overlays on top of those basic lacquer films which are not able to cope with longer residence times in the stoving furnaces. In addition, the increase in lacquering speeds improves the profitability of the lacquering.

Polycarboxylic acid anhydrides to be used according to the invention include preferably cyclic carboxylic acid anhydride compounds of the general formula:

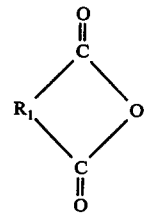

in which $R_1$ represents an optionally subsituted $C_1$ to $C_{20}$ aliphatic, $C_5$ to $C_{12}$ cycloaliphatic, heterocyclic with $C_5$ to $C_{10}$, aliphatic-aromatic with $C_7$ to $C_{20}$ or $C_6$ to $C_{12}$ aromatic radical, which in addition to the cyclic anhydride group is substituted by at least one further functional group such as a cyclic anhydride group, a carboxyl, carbalkoxy, carbaroxy, OH or $SO_3H$ group.

Examples of the carboxylic acid anhydrides used are:

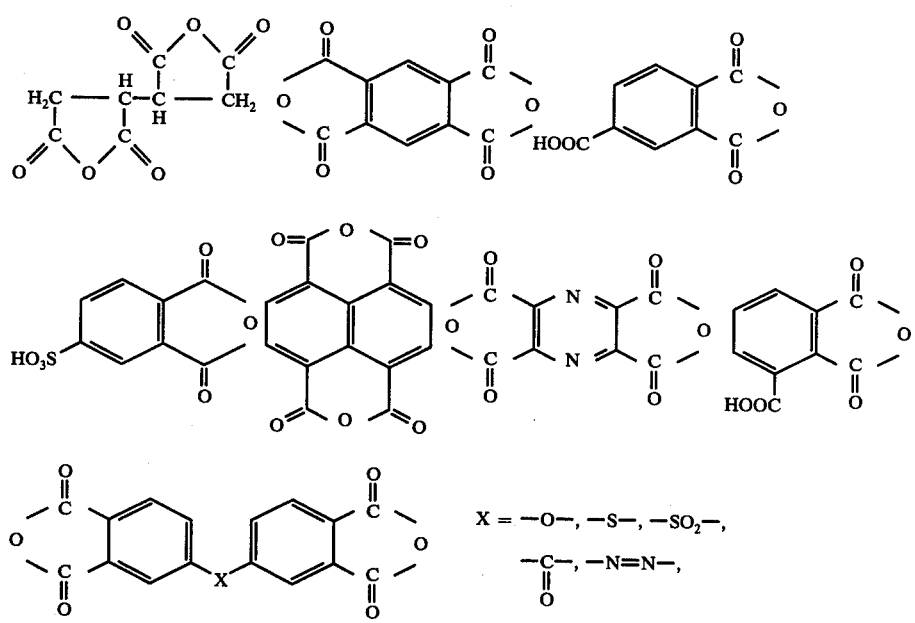

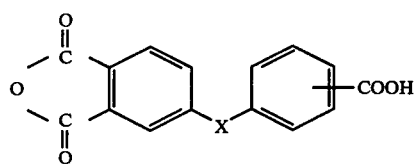

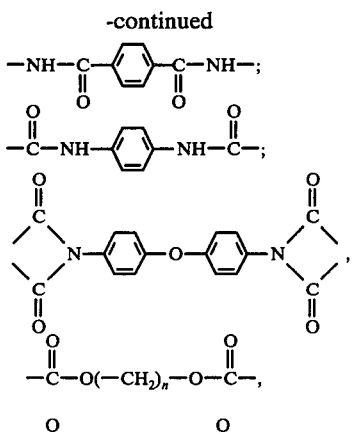

n = 2–6, preferably 2

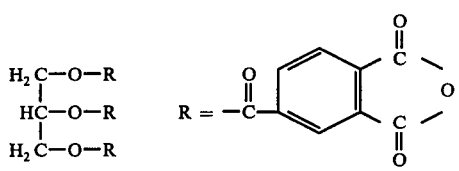

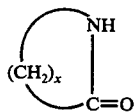

Instead of the carboxylic acid anhydrides themselves other acid derivatives such as the corresponding phenyl esters or the polycarboxylic acids themselves can be used, which in the course of the reaction are converted into the corresponding acid anhydrides. Preferably, trimellitic acid anhydride is used.

Lactams having 4 to 22 ring members can additionally be used in the process according to the invention for the production of polyamide imides, the lactams preferably corresponding to the general formula:

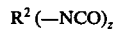

in which x represents a whole number from 2 to 20. It is particularly preferable to use caprolactam. These lactams, as specified below, can also serve as masking agents for the free NCO groups of the isocyanurates.

Isocyanates which may be used include aliphatic, cycloaliphatic, araliphatic, aromatic and heterocyclic polyisocyanates (cf. Annalen 562, pages 75 to 136), for example ethylene diisocyanate, 1,4-tetra-methylene diisocyanate, 1,6-hexamethylene diisocyanate, 1,12-dodecane diisocyanate, cyclobutene 1,3-diisocyanate, cyclohexane 1,3- and 1,4-diisocyanate and any mixtures of these isomers, 1-isocyanato-3,3,5-trimethyl-5-isocyanato-methyl-cyclohexane (German Auslegeschrift No. 1,202,785), 2,4- and 2,6-hexahydrotoluylene diisocyanate and any mixtures of these isomers, hexahydro 1,3- and/or 1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and any mixtures of these isomers, diphenylmethane-2,4'- and/or -4,4'-diisocyanate, naphthylene-1,5-diisocyanate, triphenylmethane-4,4',4''-triisocyanate, polyphenyl-polymethylene-polyisocyanates, as obtained by aniline formaldehyde condensation and subsequent phosgenation and described for example in British Pat. Nos. 874,430 and 848,671, perchlorinated aryl polyisocyanates, as described in German Pat. No. 1,092,007, diisocyanates as described in U.S. Pat. No. 3,492,330, polyisocyanates having allophanate groups, as for example described in British Pat. No. 994,890, Belgian Pat. No. 761,626 and the published Dutch Patent Application No. 7,102,524, polyisocyanates having urethane groups, as for example described in Belgian Pat. No. 752,261 or in U.S. Pat. No. 3,394,164, polyisocyanates containing acylated urea groups according to German Pat. No. 1,230,778 polyisocyanates having biuret groups, as for example described in German Pat. No. 1,101,394, British Pat. No. 889,050 and in French Pat. No. 7,017,514, polyisocyanates produced by telomerisation reactions, as for example described in Belgian Pat. No. 723,640 polyisocyanates having ester groups, as for example described in British Pat. Nos. 956,474, and 1,072,956, in U.S. Pat. No. 3,567,763 and in German Pat. No. 1,231,688 and reaction products of the above mentioned isocyanates with acetals according to German Pat. No. 1,072,385.

It is also possible to use the distillation residues which have isocyanate groups and which occur in the technical preparation of isocyanates, optionally dissolved in one or more of the above mentioned polyisocyanates. It is also possible to use any mixtures of the above mentioned polyisocyanates.

Suitable polyisocyanates of the following formula are preferred.

$$R^2(-NCO)_z$$

in which $R^2$ represents an optionally substituted alkyl radical having from 1 to 20 C-atoms, an aryl radical having from 6 to 12 C-atoms, a cycloalkyl radical having from 5 to 12 C-atoms, an alkyl-aryl radical having from 7 to 20 C-atoms and an aryl or cycloalkyl radical having from 5 to 12 C-atoms and containing hetero atoms such as N, O or S. Z is a whole number from 2 to 4, preferably 2 to 3.

Preference is given to the use of the technically readily available mixtures of toluylene-diisocyanates, m-phenylene diisocyanate, and phosgenated condensates of aniline and formaldehyde having a polyphenylene-methylene structure and the symmetrical compounds, 4,4'-diisocyanatodiphenylmethane, 4,4'-diisocyanatodiphenylether, p-phenylene diisocyanate, 4,4'-diisocyanato-diphenyl-dimethylmethane, similar hydroaromatic diisocyanates and aliphatic diisocyanates having from 2 to 12 carbon atoms such as hexamethylene diisocyanate and isophorone diisocyanate.

The isocyanates may be used in free form, and in addition partially or completely in the form of masked isocyanates which are formed by reaction with compounds containing reactive hydrogen. These masked isocyanates split under the reaction conditions.

Preferred masked isocyanates are the carbamic esters obtained by the reaction of isocyanates with aromatic and aliphatic mono- and polyhydroxy compounds and the addition products obtained by the reaction of isocyanates with lactams, oximes and CH-acid compounds.

Examples which should be mentioned include the masked isocyanates formed with phenol, isomeric cresols, technical mixtures thereof and similar aromatic hydroxyl compounds, aliphatic monoalcohols such as methanol, ethanol, propanol, isopropanol, butanol, isobutanol, cyclohexanol, benzyl alcohol and aliphatic di- or polyols such as ethylene glycol and trimethanol, propane, 2-pyrrolidone, caprolactam, butanone oxime, malonic ester and acetic acid ester.

The masked isocyanates may be used as such or produced in situ from the components.

If polyols with at least 2 OH-groups in the molecule are used in the polycondensation, polyimide esters are obtained. According to a preferred embodiment, the polyols are reacted with the polyisocyanates or isocyanato-isocyanurates to form (poly)carbamic acid esters and these are polycondensed with the cyclic carboxylic acid anhydrides. The quantitative ratios of the polyisocyanate to the isocyanato-isocyanurates are selected in such a way that 1-60% preferably 5-40% of the carbamic ester are formed with corresponding stoichiometric quantity of masked isocyanato-isocyanurates. The exchange can also take place with an excess or a deficiency of the carbamic ester. Polyamide esters are obtained which, after optional modification by mixing with further polymers, e.g. with polyesters, polyethers or polyhydantoins are suitable for use as electrical insulation lacquers, impregnation lacquers and low solvent or solvent-free melt lacquers.

Suitable polyols preferably include low or higher molecular weight polyols, e.g. alkylene diols such as ethylene, propylene-1,2- or 1,3-, butylene-1,2-, -2,3-, -1,4- or -1,3-diols or hexamethylglycol, 1,4-cyclohexanedimethanol, trimethylolpropane, glycerine and trimethylethane. In addition, alkoxylation products of, for example, 2,2-bis-p-hydroxy-diphenylpropane or diols such as di- or triethyleneglycol, and moreover oligomeric polyesters of excess quantities of the above polyalcohols with for example tere-, iso or o-phthalic acid, trimellitic acid and adipic acid. Preferably the polyols which are used have at least 3, and particularly at least 7% OH.

The isocyanurates used in the inventive process, each molecule of which contains a plurality of masked NCO groups which are set free by splitting in heat, are produced by the polymerisation of diisocyanates of the general formula:

$$R^2(-NCO)_2$$

in which $R^2$ has the above meaning, in the presence of a trimerisation catalyst and compounds which contain reactive hydrogen atoms.

Processes for the production of higher molecular weight isocyanurates which are soluble in organic solvents and which contain isocyanate groups are known from German Pat. No. 1,035,362. According to the known process polyisocyanates containing urethane groups are first produced from diisocyanates and hydroxy compounds and the products are then polymerised at elevated temperature, optionally in the presence of tertiary amines as catalysts. Attention is also drawn to polyisocyanates having isocyanurate groups, as for example described in German Pat. Nos. 1,022,789, 1,222,067 and 1,027,394 and in German Offenlegungsschriften Nos. 1,929,034 and 2,004,048.

According to a preferred embodiment, suitable isocyanurates with masked isocyanate groups of defined composition are obtained by reacting and trimerising the melts or solutions of the diisocyanates, preferably of the aromatic diisocyanates, in the presence of a trimerisation catalyst at temperatures of from 50° to 160° C, preferably from 50° to 150° C, with organic hydroxy compounds or lactams as masking agents.

In this process, the conversion of diisocyanates into isocyanato-isocyanurates of a predetermined degree of trimerisation is possible, since surprisingly neither the masked isocyanate radicals react further under trimerisation, nor does the expected spontaneous trimerisation take place before the addition of the masking compound.

For the trimerisation reaction, the above mentioned diisocyanates can be used, but the compounds preferably used are aromatic diisocyanates such as 1,3- and 1,4-phenylene diisocyanate, 2,4- and 2,6-toluylene diisocyanates and any mixtures of these isomers, diphenylmethane 2,4'- amd/or -4,4'-diisocyanate, naphthylene 1,5-diisocyanate, triphenylmethane-4,4',4"-triisocyanate, polyphenylpolymethylene-polyisocyanates, as obtained by aniline-formaldehyde condensation and subsequent phosgenation and for example described in British Pat. Nos. 874,430 and 848,671, and perchlorinated aryl polyisocyanates, as for example described in German Auslegeschrift No. 1,157,601.

Preference is given to the technically readily available mixtures of toluylene diisocyanates, m-phenylene diisocyanate and phosgenated condensates of aniline and formaldehyde having a polyphenylene-methylene-structure and the symmetrical compounds 4,4'-diisocyanatodiphenylmethane, 4,4'-diisocyanatodiphenylether, p-phenylene diisocyanate and 4,4'-diisocyanato-diphenyldimethylmethane.

As the masking compounds with reactive hydrogen atoms for the isocyanurates, alcohols of the following formula:

$$R_3-OH$$

are used, in which $R_3$ represents an optionally substituted aliphatic $C_1-C_{20}$ or aromatic $C_6-C_{12}$ radical, and also lactams having from 4 to 22 ring members of the general formula:

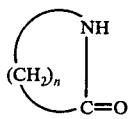

in which $n$ represents an integer of from 2 to 20.

The radical $R_1$ of the general formula is preferably an aromatic radical, derived from benzene, naphthalene, diphenyl, diphenylmethane, diphenylether, toluene and o-, m- and p-xylene. It can be substituted once or several times, for example by alkyl, halogen, nitro, alkoxy, aroxy and cyano groups. Preference is given to the use of phenol, m-, p- and o-cresol, technical cresol mixtures, pyrrolidone, caprolactam and lauryl lactam. Phenols or caprolactam are preferably used.

As catalysts, compounds are used which effect the trimerisation of isocyanates without, like alkali metal acetates and phenolates, starting a spontaneous reaction. Suitable catalysts are, for example, tertiary amines such as triethylamine, tributylamine, N-methylmorpholine, N-ethylmorpholine, N-cocomorpholine, N,N,N',N'-tetramethylethylenediamine, 1,4-diazabicyclo-(2,2,2)-octane, N-methyl-N-'-dimethylaminoethyl-piperazine, N,N-di-methylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-$\beta$-phenylethylamine, 1,2-dimethylimidazole, 2-methylimidazole, triethanolamine, N-ethyl-diethanolamine, tertiary amines having carbon-silicon bonds (cf. German Pat. No. 1,229,290) e.g. 2,2,4-trimethyl-2-silamorpholine and 1,3-diethylaminomethyl-tetramethyl-disiloxane, phosphines such as triethylphosphine, and metal salts and organic metal compounds, in particular of iron, magnesium, mercury, nickel, copper, zinc, aluminum, tin, lead, vanadium, titanium and chromium, such as tin(II) octoate, dibutyl-tin-dilaurate, iron(III) chloride and copper(II) acetylacetonate, and Mannich bases of phenols such as 2-(dimethylaminomethyl)-4,6-dimethylphenol and 2,4,6-tris-(dimethylaminomethyl)-phenol.

Preference is given to the use of tertiary amines such as N,N-bis-(dimethylaminoethyl)-N-methylamine, the isomer mixtures which occur in the technical production of this amine, and triethylenediamine.

The trimerisation can take place without solvents or in solvents which do not react under the reaction conditions or only form loose addition compounds, which react further.

Suitable solvents are aliphatic and aromatic hydrocarbons, which can be further substituted with alkyl-, halogen-, nitro- and nitrile- groups, esters, ketones, ethers, substituted amides, phosphoric acid amides, sulphoxides and sulphones, for example toluene, xylene, o-dichlorobenzene acetophenone, cyclohexanone, acetic acid ethyl ester, glycolmonoethylether acetate, light petrol, N-methylpyrrolidone, benzonitrile, hexamethylphosphoric acid triamide, tetramethylenesulphone and mixtures thereof.

To carry out the trimerisation, the isocyanate is preferably mixed with the trimerisation catalyst with or without solvent and the compound having reactive hydrogen atoms is added, optionally step by step in accordance with the heat reaction temperatures of from 0° to 160° C, preferably from 50° to 150° C. The addition and trimerisation are exothermic reactions. Optionally, the mixture is re-heated subsequently until the desired degree of reaction is achieved.

In many cases the reaction is to be conducted under an inert protective gas such as nitrogen or argon. The reaction can be carried out batchwise or continously.

In general, it is advantageous for the trimerisation reaction to use two equivalents of isocyanate per equivalent of reactive hydrogen, but considerable deviations from these quantitative ratios are possible.

The polycondensation according to the invention of polyisocyanates, polycarboxylic acid anhydrides, isocyanurates and lactams or polyols can be carried out without a solvent in the melt, or in solvents which do not react under the reaction conditions or which only form loose addition compounds which react further.

Suitable solvents are: (halogenated) hydrocarbons, phenols, esters, ketones, ethers, substituted amides, nitriles, phosphoric acid amides, sulphoxides and sulphones, e.g. xylenes, o-dichlorobenzene, phenols, cresols, acetophenone, cyclohexanone, glycolmonomethyletheracetate, N-methyl-pyrrolidone, dimethylformamide, dimethylacetamide, benzonitrile, hexamethylphosphoric acid triamide, dimethylsulphoxide, tetramethylenesulphone and mixtures thereof. Preference is given to the use of phenol, technical cresol mixtures and mixtures thereof with alkylated aromatic compounds.

After a partial or total condensation suitable combinations can also be diluted or suspended with water.

According to the inventive process the reaction components with or without solvents are kept for a period of from several minutes to several hours at temperatures of from 0° to 450° C. The end of the reaction is shown by the cessation of gas development and increasing viscosity. Occasionally it is advantageous to conduct the reaction in several stages or to add the individual components in a different sequence or at different temperatures. Thus, in the first stage, for example, in a solvent, an adduct or condensate can be produced, which is then converted at higher temperatures, possibly with the evaporation of the solvent and chain lengthening or cross-linking, into the high molecular weight condensation product. In addition, the production of the isocyanurate can take place "in situ." The reaction products can also, for example for wire lacquering, be applied as melts or as high solids systems and then be stoved and hardened at higher temperatures.

In many cases it can be recommended to carry out the reaction under an inert protective gas such as nitrogen or argon. The reaction may take place batchwise or continuously or, to achieve a higher reaction temperature, also in an autoclave under pressure.

In general, it is advantageous to select the quantitative ratios between the polyisocyanates and the polycarboxylic acid anhydrides so as to be equivalent to the reactive groups or to select an excess of the isocyanate or the carboxylic acid of up to 10%. However, wide deviations from these stoichiometric ratios are also possible. The molar ratio of the amount of lactam used, relative to 1 mol of polycarboxylic acid anhydride, is generally from 2 to 400%, preferably from 5 to 200%. The quantitative ratio of isocyanate to isocyanato-isocyanurate is generally so selected that from 1 to 60% preferably from 5 to 40%, and in particular from 5 to 20% of the total quantity of isocyanate groups are masked isocyanate groups of the isocyanato-isocyanurates.

Furthermore, the condensation products can be modified by the simultaneous use and incorporation of, for example, polyols, polyamides, aminoalcohols, polycarboxylic acids, polycarbamic esters, polyhydantoins and polyesters and polyethers. Examples which should be mentioned include ethylene glycol, trimethylol propane 4,4'-diaminodiphenylmethane, ethanolamine, isophthalic acid, trimesic acid, polycarbamic ester formed from 2,4-toluylene-diisocyanate and ethylene glycol, polyesters of terephthalic acid, ethylene glycol and glycerine, polyhydantoins formed from 4,4'-diisocyanato-diphenylmethane and bis-(methoxy-carbonyl-isopropylamine-phenyl)methane or polyethers of ethylene oxide or bis-(hydroxyphenyl)propane and epichlorhydrin.

The reaction according to the invention can be accelerated by catalysts, e.g. by borotrifluoride and its adducts, amines such as triethylamine, 1,4-diazabicyclo-(2,2,2)-octane, N-ethyl-morpholine and N-methylimidazole phenols such as phenol and m-cresol, excess lactams such as caprolactam and organic and inorganic metal compounds, in particular of iron, lead, zinc, tin, copper, cobalt and titanium such as iron(III) chloride, cobalt, acetate, lead oxide, zinc octoate, dibutyl-tin-dilaurate, copper-acetyl-acetonate and titanium tetrabutylate and by phosphorus compounds such as trialkyl phosphine and 1-methyl-phospholine oxide.

The polycondensates which can be produced by the process according to the invention, in particular polyamide imides or polyester imides, are distinguished by outstanding temperature resistance and are generally suitable for use as heat-resistant plastics, materials e.g. as lacquers, films and mouldings. Their properties can be varied for the different areas of use by changing the stoichiometric ratios, the degree of concentration and by the addition of backing materials, pigments and low and high molecular weight components, e.g. for the production of wire lacquers by mixing with polyesters, polyethers and polyhydantoins.

In the following examples all pencentages are by weight unless otherwise indicated.

EXAMPLE 1

(a) 100 g of 4,4'-diisocyanato-diphenylmethane are melted with 50 g of toluene and mixed with 1 g of a 10% solution of bis-(dimethylaminoethyl)-methylamine. The mixture is then heated to 120° C and at this temperature 37.6 g of phenol are added batchwise. To complete the isocyanurate formation, the mixture is agitated for a further 2 hours at 120° C. Then 384 g of phenol, 384 g of cresol, 226 g of caprolactam, 450 g of 4,4'-diisocyanatodiphenylmethane and 384 g of trimellitic acid anhydride are added and the mixture is heated to 205° – 210° in the course of 3 hours. The condensation takes place with the separation of carbon dioxide. The mixture is agitated for a further 4 hours at 205° to 210° and a brown viscous solution of the polyamide imide is obtained. The viscosity $\eta 20$ of a sample, diluted with cresol to 15%, is 980cP. The major portion is diluted with phenol/xylene to a solids content of 25% and used for lacquering.

(b) A wire of 0.7 mm diameter is lacquered on a vertical wire lacquering machine with the solution prepared according to (a). The lacquering conditions are as follows:

Furnace length: 4 meters

Furnace temperature: 400° C.
Stripper nozzles with the following diameter arrangement: 0.76; 0.78; 0.78; 0.80; 0.82.
Drawing speed: 6 – 9 meters per minutes.
Diameter increase due to lacquering: approx. 50 $\mu m$ The prominent features, determined according to DIN 46 453, of these lacquered wires thus obtained are:

Heat shock: 260° C
Softening point: 320° C
Pencil hardness: 5H
Alcohol resistance: 5H In comparison, a polyamide-imide produced without isocyanurato-isocyanate, when applied in the above described manner to a copper wire, produces a lacquered wire, of which the softening temperature is only just above 300° C, and of which the pencil hardness is only 3 – 4H.

EXAMPLE 2

(a) 250 g of 4,4'-diisocyanato-diphenylmethane are mixed with 0.5 g of bis-(dimethylaminoethyl)-methylamine in 50 g toluene and heated to 120° C. At this temperature, under agitation and slightly cooling, 119 g of a technical mixture of 70% m-cresol and 30% p-cresol are added during 20 minutes. The formation of the carbamic ester and the isocyanurate takes place in a slightly exothermic reaction. Subsequently, the mixture is agitated for a further 1.5 hours at 120° C and 2 hours at 130° C, with a part of the toluene being distilled off. The remainder is drawn off in a vacuum and the residue is absorbed with 631 g of cresol. A 27% (approx.) solution of the isocyanurate is obtained having a viscosity of $\eta 20$ = 3500 cP and a content of masked isocyanate of 4.6%. The IR spectrum shows bands characteristic of the isocyanurate group at 1710 $cm^{-1}$ and 1420 $cm^{-1}$.

(b) 100 g of the isocyanurate solution produced according to (a) are heated with 100 g of phenol, 30 g of cresol, 56.6 g of caprolactam, 112.5 g of 4,4'-diisocyanatodiphenylmethane and 96 g of trimellitic acid anhydride in the course of 7 hours to 205°. The mixture is then agitated for a further 4 hours at this temperature and then diluted with 400 g of phenol and 140 g of xylene to 25%. The viscosity $\eta 20$ of this solution is 2950 cP and the IR spectrum shows bands characteristic of the imide group at 1715 $cm^{-1}$.

(c) As described in Example 1, a copper wire of 0.7 mm is lacquered with the lacquer solution obtained. The drawing speed can be increased to 11 meters/minute, without any change in the physical properties of the wire which properties are as good as of the wire manufactured according to Example 1.

EXAMPLE 3

68 g of caprolactam, 100 g of the 25% isocyanurate solution produced according to 1 (b) and 78.3 g of a mixture of 80 parts of 2,4-toluylene diisocyanate and 20 parts of 2,6-toluylene diisocyanate are mixed with 100 g of phenol and 30 g of cresol. Then 96 g of trimellitic acid anhydride are added and the mixture is heated over a period of 6 hours to 200°. The mixture is agitated for a further 5 hours at this temperature and a brown viscous solution of the polyamide imide is obtained which is diluted with 250 g cresol and 250 g of phenol. A sample is applied to a plate and stoved at 250° to form a clear elastic lacquer film, which shows the bands characteristic of imides at 1710 and 1770 $cm^{-1}$.

EXAMPLE 4

(a) 174 g of a mixture of 20 parts of 2,6-toluylene diisocyanate and 80 parts of 2,4-toluylene diisocyanate are mixed with 50 g of toluene and 0.35 g of bis-(dimethylaminoethyl)-methylamine. Then at 120° 108 g of m-cresol are added dropwise and the mixture is agitated for a further 3 hours at 120° C. Subsequently the residual toluene is distilled off in a vacuum. A viscous melt is obtained with an isocyanate content of 14.1% and a band characteristic of the isocyanurate ring at 1715 cm$^{-1}$. The reaction product is dissolved in 218 g of cresol.

(b) A melt of 100 g of phenol, 30 g of cresol, 56.6 g of caprolactam, 50 g of the isocyanurate solution produced according to (a), 112.5 g of 4,4'-diisocyanato-diphenylmethane and 96 g of trimellitic acid anhydride is heated over a period of 6 hours to 205° – 210°. The condensation takes place under evolution of carbon dioxide. The mixture is agitated for a further 5 hours at this temperature and after adding 250 g of phenol and 250 g of cresol a clear solution of the polyamide imide is obtained. A sample of this solution is stoved on a plate to form a clear elastic lacquer film, which at 1715 cm$^{-1}$ shows the characteristic imide bands and at 1675 cm$^{-1}$ shows a characteristic amide band.

EXAMPLE 5

(a) 3000 g of 4,4'-diisocyanato-diphenylmethane are melted with 600 g of toluene, mixed with 3.0 g of bis-(dimethylaminoethyl)-methylamine and heated to 120°. Then at this temperature 1350 g of caprolactam are added batchwise and the mixture is agitated for 2 hours at 120° and 4 hours at 150° C. Subsequently a further 3.0 g of bis-(dimethylaminoethyl)-methylamine are added and the melt is heated for a further 6 hours at 150° C. Thereafter the reaction product is poured out and solidifies during cooling to form a brittle colourless resin. The content of masked isocyanate is 11.5%.

(b) 100 g of phenol, 100 g of m-cresol, 45.2 g of caprolactam, 36.3 g of the isocyanurate produced according to (a), 112.5 g of 4,4'-diisocyanatodiphenylmethane and 96 g of trimellitic acid anhydride are heated over a period of 3 hours to 205° and then agitated for a further 4 hours at this temperature. Then the mixture is diluted to 25% with 400 g of phenol, xylenol, solvent naphtha and xylene and this polyamide imide solution is used to lacquer a copper wire of 0.7 mm diameter. The arrangement of the experiment is the same as in Example 1. The properties of the lacquered wire thus obtained are the same as the wire described in Example 1.

EXAMPLE 6

(a) 108 g of a mixture of 70 parts of m-cresol and 30 parts of p-cresol are added dropwise to 278 g of 4,4'-diisocyanato-diphenylpropane, 50 g of xylene and 0.28 g of bis-(dimethylamino ethyl)-methylamine. The mixture is stirred for a further 2 hours at 110°, diluted with 614 g cresol and a light brown solution of the isocyanurate is obtained with a content of masked isocyanate of 5.8%.

(b) 56.6 g of caprolactam, 100 g of the isocyanurate solution produced according to (a) and 112.5 g of 4,4'-diisocyanato-diphenylmethane are placed in 100 g of phenol and 30 g m-cresol. Then 96 g of trimellitic acid anhydride are added and the condensation is carried out over 4 hours at 205° after a heating time of 3 hours. The mixture is diluted while still hot with 400 g of xylenol and 140 g of solvent naphtha and a 25% solution of the polyamide imide is obtained having a viscosity $\eta 20$ of 4400 cP.

(c) A wire of 1.0 mm diameter is lacquered on a wire lacquering machine 5 meters in length. The other conditions are:

Furnace Temperature

Top 400° C
Bottom 500° C
Nozzle arrangement: 1.04, 1.06, 1.08, 1.10, 1.12, 1.12.
Diameter increase due to lacquering 55 – 65 mm. Up to a drawing speed of 20 meters/minutes a wire lacquer of excellent qualities and with a softening temperature of over 330° C is obtained.

EXAMPLE 7

(a) 250 g of 4,4'-diisocyanato-diphenylmethane are mixed with 0.5 g of bis-(dimethylaminoethyl)-methylamine in 50 g of toluene and heated to 120° C. At this temperature under agitation and slightly cooling, 119 g of a technical mixture of 70% m-cresol and 30% p-cresol are added over a period of 20 minutes. The formation of the carbamic ester and the isocyanurate takes place in a slightly exothermic reaction. Subsequently the mixture is agitated for a further 1.5 hours at 120° and 2 hours at 130°, with a part of the toluene being distilled off. The remainder is drawn off in a vacuum and the residue is absorbed with 631 g of cresol. A 25% (approximately) solution of the isocyanurate is obtained having a viscosity of $\eta 20 = 3500$ cP and having a content of masked isocyanate of 4.6%. The IR spectrum shows the bands characteristic of the isocyanurate group at 1710 cm$^{-1}$ and 1420 cm$^{-1}$.

(b) 105 g of the isocyanurate solution produced according to (a) and 100 g of 4,4'-diisocyanato-diphenylmethane are added to a solution of 31 g of ethylene glycol in 290 g of cresol. The mixture is agitated for 1 hour at 120° and then 192 g of trimellitic acid anhydride are added and the temperature is increased in the course of 9 hours to 205° – 210°. The condensation takes place under separation of carbon dioxide and water. The mixture is agitated for a further 3 hours at 210° and after diluting with 220 g of phenol a brown viscous solution of the polyamide ester is obtained. The viscosity $\eta 20$ of a sample diluted with cresol to 15% is 280 cP. The main portion is diluted with technical cresol/xylene to a solids content of 25%.

(c) 250 parts by weight of this solution are mixed with 250 parts by weight of a 30% solution of a terephthalic acid polyester in a solvent mixture of cresol/xylene such as 8:2. The cooled solution of 1.5 g of butyl titanate in 30 g of cresol is added thereto, having been heated previously for 10 minutes to 120° C. The polyester used is obtained in known manner by the heating of 384 g of terephthalic acid dimethylester, 93 g of glycol and 46 g of glycerine in the presence of 0.5 g of lead monoxide as the catalyst.

Lacquering is carried out on a vertical wire lacquering machine 4 meters in length at a furnace temperature of 400° C within the speed range of from 6 to 10 meters/minute. After 6 passes of the applicator equipped with stripper nozzles and of the stoving core a diameter increase of approximately 55 mm of the 0.7 mm thick copper wire is obtained.

The wire lacquer produced in this way displays over the whole stove lacquer a softening temperature of over 300° C in accordance with DIN 46 523. The pencil hardness is 5H. This value only falls minimally even when the lacquered wire 5 contacted with ethanol. It drops by a maximum to hardness of 4H. For the abrasion resistance according to DIN 46 513 values of 120 – 150 double strokes were measured. In this case the dependence on the degree of stoving is also slight. However, if the terephthalic acid polyester mentioned above is combined with a polyimide ester, which has been produced without isocyanurate compounds, then the temperature of softening is highly dependent on the degree of stoving. It is not possible to obtain values of over 300° C at a drawing speed of 8 meters/minute. The values for pencil hardness and solvent resistance are also at least 1 hardness grade worse. The same is true for the abrasion resistance. Values of 120 – 150 double strokes are not achieved and at higher drawing speeds a distinct drop in values can be recorded.

What we claim is:

1. In the process for the production of a polycondensate coupled through imide groups by condensing a polycarboxylic acid anhydride with a polyisocyanate and a member selected from the group consisting of a lactam and a polyol, the improvement wherein 1 – 60% of the total quantity of isocyanate is in the form of an isocyanurate substituted with masked isocyanate groups.

2. A process as claimed in claim 1, wherein the lactam or polyol taking part in the polycondensation is also used to in situ mask the isocyanate groups.

3. A process according to claim 1, wherein the lactam has at least 4 ring members.

4. A process as claimed in claim 1, wherein the polycondensation takes place at temperature of from 0° to 450° C.

5. A process as claimed in claim 1, wherein the polycondensation takes place in the presence of a catalyst.

6. A polycondensate prepared by a process as claimed in claim 1.

7. A metal substrate lacquered with a polycondensate as claimed in claim 6.

8. A wire lacquered with a polycondensate as claimed in claim 6.

9. A process as claimed in claim 1, wherein the polycarboxylic acid anhydride is a cyclic carboxylic acid anhydride compound substituted by at least one substituent selected from the group consisting of another cyclic anhydride group, a carboxyl group, a carbalkoxy group, a carbaroxy group of $SO_3H$ group.

10. A process as claimed in claim 1, wherein the isocyanate groups of the isocyanurate are masked with a member selected from the group consisting of lactam having at least 4 ring members, an aliphatic mono-hydroxy compound and an aromatic mono-hydroxy compound.

11. A process as claimed in claim 1, wherein the aromatic mono-hydroxy compound is a phenol.

12. A process as claimed in claim 1, wherein polyisocyanates of the general formula $$R^2(-NCO)_z$$

are used in which $R^2$ represents alkyl having from 1 to 20 C-atoms, aryl having from 6 to 12 C-atoms, cycloalkyl having from 5 to 12 C-atoms, alkaryl having from 7 to 20 C-atoms, and heteroaryl or hetero-cycloalkyl having from 5 to 12 C-atoms and wherein the hetero atom is selected from the group consisting of nitrogen, oxygen and sulfur, and $z$ is a whole number from 2 to 4.

13. A process as claimed in claim 12, wherein the polyisocyanate is selected from the group consisting of toluylene-diisocyanates, m-phenylene diisocyanate, phosgenated condensates of aniline and formaldehyde having a polyphenylene-methylene structure, 4,4'-diisocyanato-diphenylmethane, 4,4'-diisocyanatodiphenylether, p-phenylene diisocyanate, 4,4'-diisocyanato-diphenyldimethylmethane, aliphatic hexamethylene diisocyanate and isophorone diisocyanate.

14. A process as claimed in claim 1, wherein a polyol is used, said polyol being selected from the group consisting of alkanols having at least two OH groups in the molecule and oligomeric polyesters having at least 3% OH.

* * * * *